United States Patent
Takeda et al.

(10) Patent No.: US 10,852,555 B2
(45) Date of Patent: Dec. 1, 2020

(54) HEAD-MOUNTED DISPLAY APPARATUS

(71) Applicant: SEIKO EPSON CORPORATION, Tokyo (JP)

(72) Inventors: Takashi Takeda, Suwa (JP); Takeshi Koshihara, Matsumoto (JP); Masatoshi Yonekubo, Hara-mura (JP); Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/666,515

(22) Filed: Oct. 29, 2019

(65) Prior Publication Data

US 2020/0133004 A1 Apr. 30, 2020

(30) Foreign Application Priority Data

Oct. 30, 2018 (JP) ................. 2018-204046

(51) Int. Cl.
*G09G 5/02* (2006.01)
*G02B 27/01* (2006.01)

(52) U.S. Cl.
CPC ......... *G02B 27/0172* (2013.01); *G09G 5/026* (2013.01); *G02B 2027/0112* (2013.01); *G02B 2027/0174* (2013.01); *G02B 2027/0178* (2013.01)

(58) Field of Classification Search
CPC ........ G02B 27/0172; G02B 2027/0174; G02B 2027/0178; G02B 2027/0112; G02B 27/141; G02B 27/102; G02B 2027/011; G09G 5/026; G09G 3/002
See application file for complete search history.

(56) References Cited

U.S. PATENT DOCUMENTS

| | | | |
|---|---|---|---|
| 5,483,307 A | 1/1996 | Anderson | |
| 7,528,359 B2 * | 5/2009 | Nishida | G03B 21/208 |
| | | | 250/216 |
| 8,570,244 B2 * | 10/2013 | Mukawa | G02B 27/0176 |
| | | | 345/8 |
| 10,473,926 B2 * | 11/2019 | Lee | G02B 27/01 |
| 10,712,775 B2 * | 7/2020 | Richards | G02B 6/0068 |
| 2010/0046070 A1 | 2/2010 | Mukawa | |
| 2013/0135747 A1 | 5/2013 | Yano | |

FOREIGN PATENT DOCUMENTS

| | | |
|---|---|---|
| JP | H08-190072 A | 7/1996 |
| JP | 2012-018414 A | 1/2012 |
| JP | 2013-109301 A | 6/2013 |

* cited by examiner

*Primary Examiner* — Bryan Earles
(74) *Attorney, Agent, or Firm* — JCIPRNET (57) ABSTRACT

A head-mounted display apparatus according to the present disclosure includes an image generating module, a first deflecting element including a first deflecting portion configured to deflect, along a second optical axis intersecting the first optical axis, imaging light from the image generating module, and a second deflecting portion configured to deflect the imaging light along a third optical axis, a first diffraction element configured to diffract the imaging light from the second deflecting portion, and a second diffraction element configured to diffract the imaging light from the first diffraction element. A distance along the first optical axis between the image generating module and the first deflecting portion is longer than a distance along the third optical axis between the first diffraction element and the second deflecting portion.

6 Claims, 6 Drawing Sheets

HEAD-MOUNTED DISPLAY APPARATUS

The present application is based on, and claims priority from JP Application Serial Number 2018-204046, filed Oct. 30, 2018, the disclosure of which is hereby incorporated by reference herein in its entirety.

BACKGROUND

1. Technical Field

The present disclosure relates to a head-mounted display apparatus.

2. Related Art

There are known head-mounted display apparatuses having a configuration in which imaging light is guided to an eye of an observer by using a plurality of reflection surfaces to reflect the imaging light. JP-A-2012-18414 discloses a head-mounted display apparatus including a frame, an image generating device, a light-guiding plate configured to guide, to an eye of an observer, light emitted from the image generating device, and a first deflecting means and a second deflecting means configured to reflect light incident on the light-guiding plate.

In the head-mounted display apparatus disclosed in JP-A-2012-18414, the light-guiding plate is used as a means for guiding, to an eye of an observer, light emitted from the image generating device. As a result, the apparatus has a problem of becoming large and heavy. In addition, there has been a problem in that an overweight of the apparatus may be applied to the nose of a user depending on design parameters such as size, weight, and arrangement of the various optical members, and thus, may give the user an unpleasant feeling.

SUMMARY

To achieve the object described above, a head-mounted display apparatus according to an aspect of the present disclosure includes an image generating module configured to emit imaging light along a first optical axis, a first deflecting element including a first deflecting portion and a second deflecting portion, a first diffraction element configured to diffract the imaging light deflected by the second deflecting portion, and a second diffraction element configured to diffract the imaging light diffracted by the first diffraction element to form an exit pupil. The first deflecting portion is configured to deflect, along a second optical axis intersecting the first optical axis, the imaging light emitted from the image generating module, and the second deflecting portion is configured to deflect, along a third optical axis intersecting the second optical axis, the imaging light deflected by the first deflecting portion. The image generating module includes a plurality of image generating panels for emitting different colors of emission light and a color synthesizing element configured to synthesize the emission light emitted from the plurality of image generating panels, and the color synthesizing element includes a first synthesis film and a second synthesis film, which are intersect each other. Each of the plurality of image generating panels is disposed to face the color synthesizing element, and a longitudinal direction of an image generating region of the image generating panel is parallel to a line of intersection of the first synthesis film and the second synthesis film, and a distance along the first optical axis between the image generating module and the first deflecting portion is longer than a distance along the third optical axis between the first diffraction element and the second deflecting portion.

In the head-mounted display apparatus according to the aspect of the present disclosure, the color synthesizing element may be oriented so that the line of intersection intersects the second optical axis when viewed from a direction of the first optical axis.

The head-mounted display apparatus according to the aspect of the present disclosure may further include a driving circuit board configured to drive the plurality of image generating panels. In this configuration, the first diffraction element may include a first surface facing the second deflecting portion and a second surface opposite to the first surface, and the driving circuit board may be positioned to face the second surface of the first diffraction element.

The head-mounted display apparatus according to the aspect of the present disclosure may further include a frame configured to accommodate the image generating module, the first deflecting element, the first diffraction element, and the second diffraction element, a temple coupled to the frame, and a coupling portion configured to foldably couple the temple to the frame. In this configuration, the coupling portion may be positioned to face the second surface of the first diffraction element.

The head-mounted display apparatus according to the aspect of the present disclosure may further include a second deflecting element configured to reflect, toward the second diffraction element, the imaging light diffracted by the first diffraction element and transmit external light.

In the head-mounted display apparatus according to the aspect of the present disclosure, the first diffraction element and the second diffraction element may include a reflection-type volume hologram.

DESCRIPTION OF EXEMPLARY EMBODIMENTS

First Embodiment

A first embodiment according to the present disclosure will be described below with reference to FIGS. 1 to 4.

Figure 1:
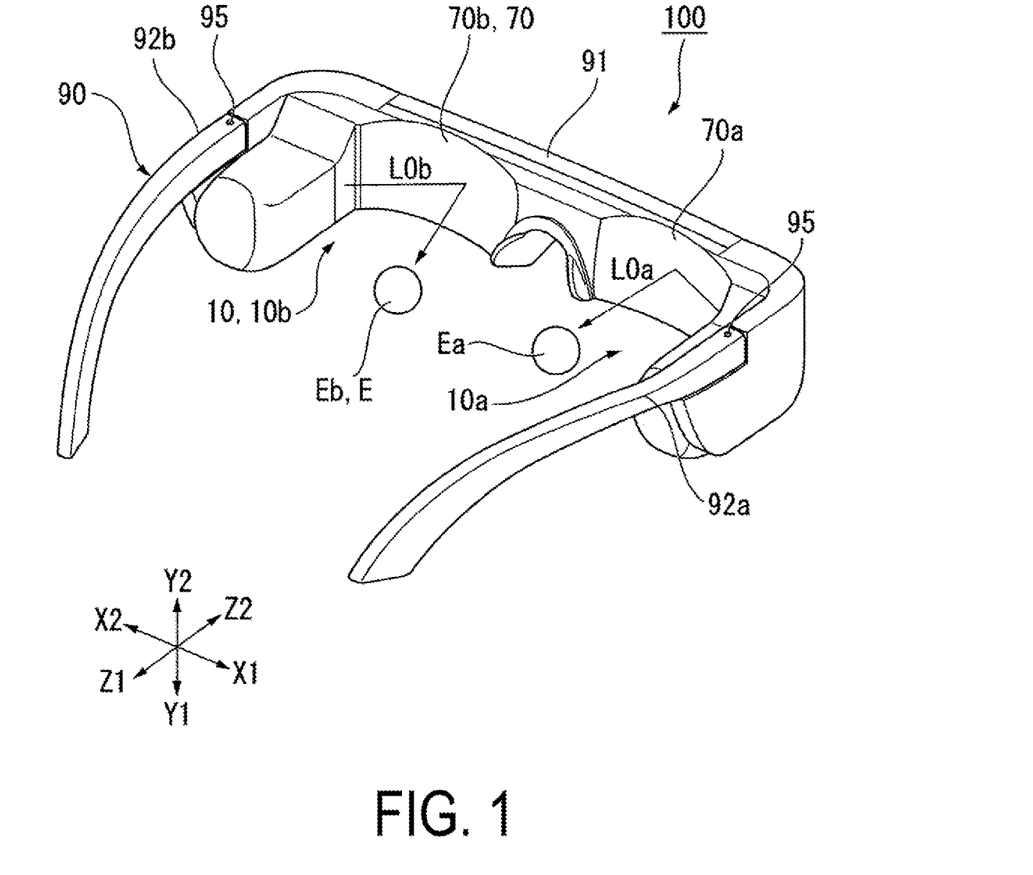
FIG. 1 is a perspective view of a head-mounted display apparatus according to a first embodiment.

FIG. 1 is a perspective view illustrating the appearance of a head-mounted display apparatus.

In the following description, the head-mounted display apparatus is simply referred to as a display apparatus. In addition, in the drawings, the dimensions of some components may be scaled differently for ease of understanding for the components.

In the drawings, based on the front-rear direction, the left-right direction, and the up-down direction when the display apparatus is mounted on a head of a user, the following directions are defined. The up-down direction is defined as a first direction Y, a direction from top to bottom is defined as a one direction Y1 of the first direction Y, and a direction from bottom to top is defined as an another direction Y2 of the first direction Y. The front-rear direction is defined as a second direction Z, a direction from front to rear is defined as a one direction Z1 of the second direction Z, and a direction from rear to front is defined as an another direction Z2 of the second direction Z. The left-right direction is defined as a third direction X, a direction from left to right is defined as a first direction X1 of the third direction X, and a direction from right to left is defined as a second direction X2 of the third direction X. The first direction Y, the second direction Z, and the third direction X intersect each other.

As illustrated in FIG. 1, a display apparatus 100 includes a right-eye optical system 10a configured to cause imaging light L0a to be incident on a right eye Ea and a left-eye optical system 10b configured to cause imaging light L0b to be incident on a left eye Eb. For example, the display apparatus 100 has a glasses-like shape. Specifically, the display apparatus 100 further includes a housing 90 configured to hold the right-eye optical system 10a and the left-eye optical system 10b. The display apparatus 100 is mounted on a head of an observer by the housing 90.

The display apparatus 100 includes, as the housing 90, a frame 91, a temple 92a provided on the right side of the frame 91 and configured to be hooked on the right ear of the observer, and a temple 92b provided on the left side of the frame 91 and configured to be hooked on the left ear of the observer. The frame 91 accommodates an image generating module 21, a first deflecting element 23, a first diffraction element 50, and a second diffraction element 70, which are included in an optical system 10 described below. Each of the temples 92a and 92b is foldably coupled to the frame 91 by a hinge 95.

The right-eye optical system 10a and the left-eye optical system 10b have the same basic configuration. Therefore, the right-eye optical system 10a and the left-eye optical system 10b will be described as the optical system 10 without distinction in the description below.

Figure 2:
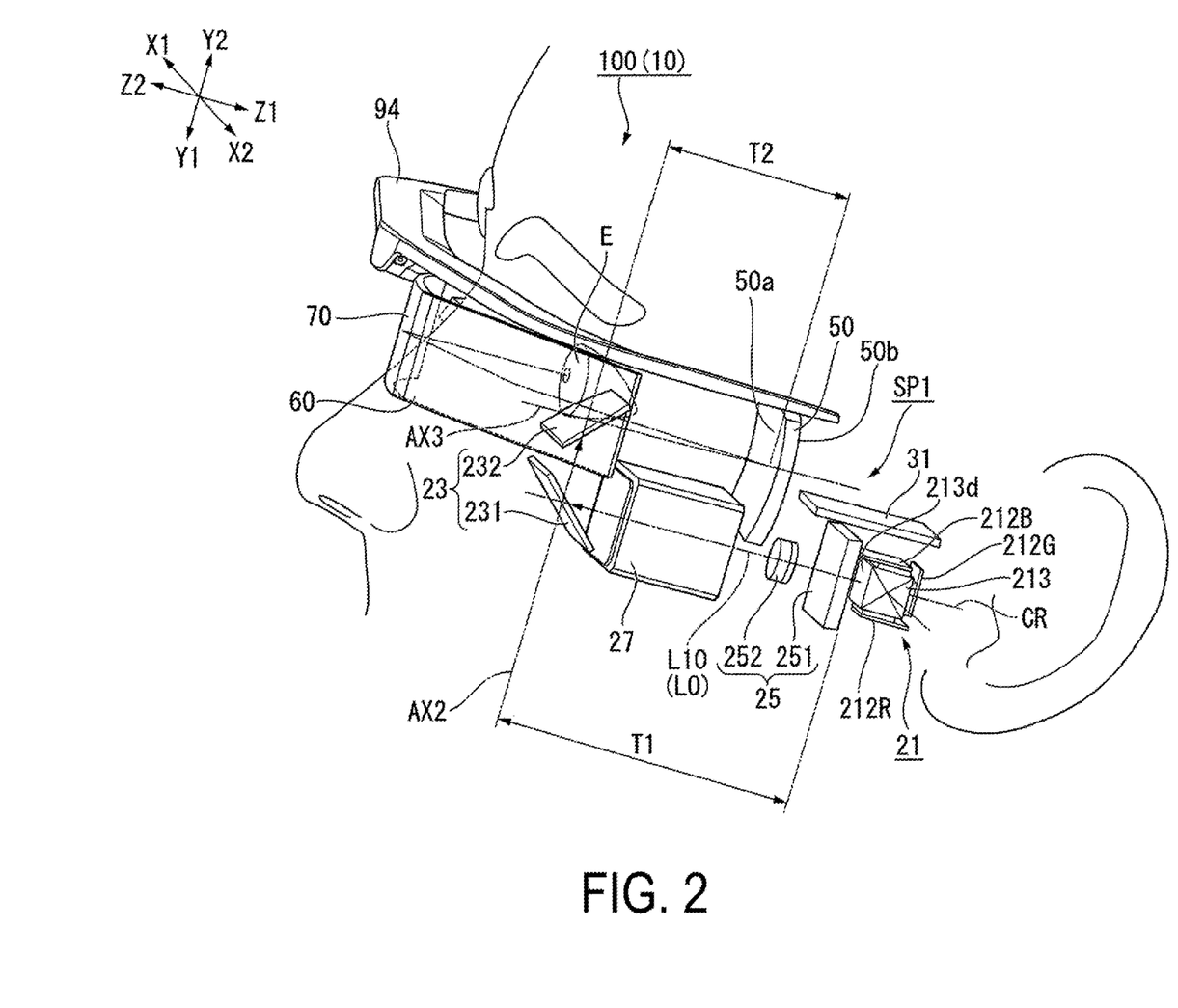
FIG. 2 is a perspective view of an optical system of the head-mounted display apparatus.

FIG. 2 is a perspective view illustrating the optical system 10 of the display apparatus 100. In FIG. 2, the frame 91, temples 92a and 92b, etc., included in the housing 90, are not illustrated, and only a rim 94 is illustrated.

As the optical system 10, the display apparatus 100 includes the image generating module 21, a light-guiding optical system 25, a projection optical system 27, the first deflecting element 23, the first diffraction element 50, a second deflecting element 60, the second diffraction element 70, and a driving circuit board 31, as illustrated in FIG. 2. The first deflecting element 23 includes a first mirror 231 (first deflecting portion) and a second mirror 232 (second deflecting portion). The first diffraction element 50 and the second diffraction element 70 include a reflection-type volume hologram described below.

The image generating module 21 includes three image generating panels 212R, 212G, and 212B and a color synthesizing element 213. The three image generating panels 212R, 212G, and 212B are each configured to emit a different color of imaging light L0. The color synthesizing element 213 is configured to synthesize the different colors of imaging light L0 emitted from the three image generating panels. The detailed configuration of the image generating module 21 will be described later.

The image generating module 21 includes a fourth surface 213d, which is an emission surface of the color synthesizing element 213 described below. A principal ray of the imaging light L0 emitted from the center of the fourth surface 213d is referred to as a central principal ray L10. An axis that coincides with the optical path of the central principal ray L10 between the image generating module 21 and the first mirror 231 is referred to as a first optical axis AX1. In other words, the image generating module 21 is configured to emit the imaging light L0 along the first optical axis AX1.

An axis that coincides with the optical path of the central principal ray L10 of the imaging light L0 traveling from the first mirror 231 to the second mirror 232 after deflected by the first mirror 231 is referred to as a second optical axis AX2. An axis that coincides with the optical path of the central principal ray L10 of the imaging light L0 traveling from the second mirror 232 to the first diffraction element 50 after deflected by the second mirror 232 is referred to as a third optical axis AX3.

The light-guiding optical system 25 includes a first lens 251 and a second lens 252, which are arranged in this order from the closer side to the image generating module 21. The light-guiding optical system 25 is configured to guide, to the projection optical system 27, the imaging light L0 emitted from the image generating module 21. Each of the first lens 251 and the second lens 252 is formed by a convex lens. The shape and number of lenses included in the light-guiding optical system 25 can be changed as appropriate.

The projection optical system 27 includes a plurality of projection lenses (not illustrated). The projection optical system 27 is configured to project the imaging light L0 generated by image generating module 21.

The first deflecting element 23 includes the first mirror 231 and the second mirror 232. Each of the first mirror 231 and the second mirror 232 is formed by a total reflection mirror. The first mirror 231 is disposed on the first optical axis AX1 and on a light emission side of the projection optical system 27. Further, the first mirror 231 is angled such that an angle between the first optical axis AX1 and the first mirror 231 and an angle between the second optical axis AX2 and the first mirror 231 are about 45 degrees. As a result, the first mirror 231 is configured to deflect the imaging light L0, which has been emitted from the image generating module 21, in an another direction Y2 (upward) of the first direction Y and along the second optical axis AX2 orthogonal to the first optical axis AX1.

The second mirror 232 is disposed on the second optical axis AX2 and on a light emission side of the first mirror 231. Further, the second mirror 232 is angled such that an angle between the second optical axis AX2 and the second mirror 232 and an angle between the third optical axis AX3 and the second mirror 232 are about 45 degrees. As a result, the second mirror 232 is configured to deflect the imaging light L0, which has been deflected by the first mirror 231, in a one direction Z1 (rearward) of the second direction Z and along the third optical axis AX3 orthogonal to the second optical axis AX2.

In the present embodiment, the second optical axis AX2 is orthogonal to the first optical axis AX1. However, the second optical axis AX2 may not necessarily be orthogonal to the first optical axis AX1, as long as the second optical axis AX2 intersects the first optical axis AX1. In other words, the first mirror 231 may not perpendicularly bend the optical path of the imaging light L0 emitted from the image generating module 21. Similarly, although, in the present embodiment, the third optical axis AX3 is orthogonal to the second optical axis AX2. However, the third optical axis AX3 may not necessarily be orthogonal to the second optical axis AX2, as long as the third optical axis AX3 intersects the second optical axis AX2. In other words, the second mirror 232 may not perpendicularly bend the optical path of the imaging light L0 deflected by the first mirror 231.

In the present embodiment, the first mirror 231 and the second mirror 232 are separate mirrors, but the first mirror 231 and the second mirror 232 may be formed by a single mirror. In this case, the single mirror may be a mirror including a planar reflective surface in a bent configuration, or a mirror including a curved reflecting surface. Further, each of the first mirror 231 and the second mirror 232 may be formed by a half mirror instead of a total reflection mirror. By this configuration, a range in which external light can be visually recognized can be enlarged.

Figure 3:
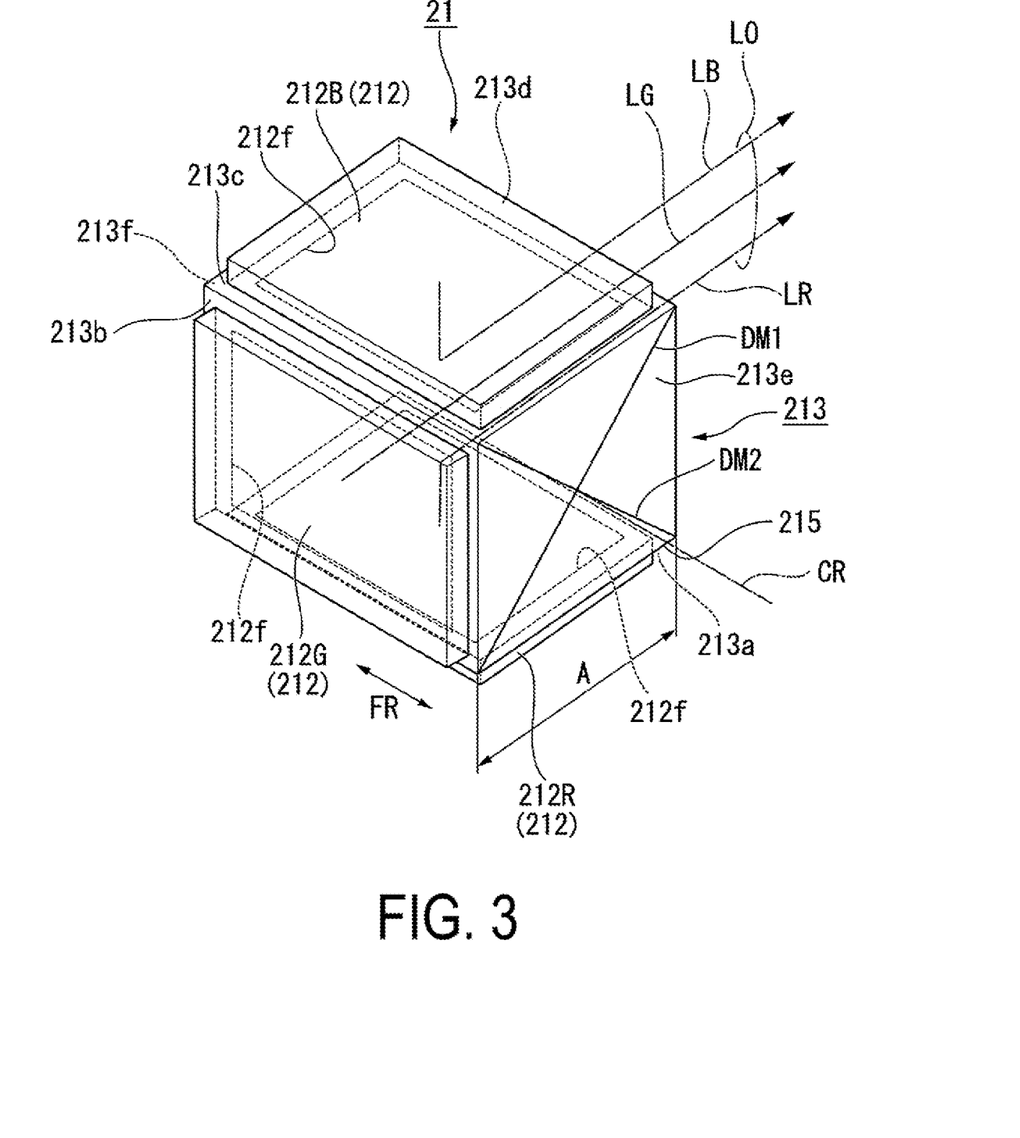
FIG. 3 is a perspective view of an image generating module.

FIG. 3 is a perspective view of the image generating module 21.

As illustrated in FIG. 3, the color synthesizing element 213 includes a cross dichroic prism. The cross dichroic prism is a quadrangular prism shaped member having a configuration in which four prism members 215 each having a triangular prism shape are bonded together. Specifically, the four prism members 215 are congruent, and each have a top surface and a bottom surface each being an isosceles right triangle. The four prism members 215 form a configuration in which the side surfaces of the prism members 215 are bonded so that the positions of the right-angled vertices of the bottom surfaces coincide, and the positions of the right-angled vertices of the top surfaces coincide. Here, the four ridges connecting the vertex of the bottom surface and the vertex of the top surface of the respective prism members 215 coincide with each other to form a line of intersection CR.

Further, on bonded surfaces that are the side surfaces of each of the prism members 215, a first synthesis film DM1 and a second synthesis film DM2 are formed. The first synthesis film DM1 and the second synthesis film DM2 are each formed by a dichroic film including a dielectric multilayer film, for example, and intersect each other. In other words, the line of intersection of the first synthesis film DM1 and the second synthesis film DM2 is the line of intersection CR described above.

The image generating panels 212R, 212G, and 212B are bonded onto surfaces 213a, 213b, and 213c, which are three of the four surfaces of the color synthesizing element 213 parallel to the line of intersection CR, respectively. The first image generating panel 212R configured to emit red first imaging light LR is bonded to the first surface 213a. The second image generating panel 212G configured to emit green second imaging light LG is bonded to the second surface 213b. The third image generating panel 212B configured to emit blue third imaging light LB is bonded to the third surface 213c. Hereinafter, the first image generating panel 212R, the second image generating panel 212G, and the third image generating panel 212B may be simply referred to as the image generating panel 212, when it is not necessary to regard these image generating panels as different things.

The first synthesis film DM1 formed by a dichroic film has a characteristic of reflecting red light and transmitting green light and blue light. The second synthesis film DM2 formed by a dichroic film has a characteristic of reflecting blue light and transmitting green light and red light. As a result, the first imaging light LR, the second imaging light LG, and the third imaging light LB are synthesized, and the full color imaging light L0 is emitted from the fourth surface 213d.

The two surfaces of the color synthesizing element 213, which are opposite to each other and perpendicular to the first surface 213a, the second surface 213b, the third surface 213c, and the fourth surface 213d, are referred to as a fifth surface 213e and a sixth surface 213f. The shapes of the fifth surface 213e and the sixth surface 213f are square.

The image generating panel 212 may be a self-luminous panel such as an organic electroluminescence panel, for example. Alternatively, the image generating panel 212 may include a light modulating device such as a transmissive liquid crystal panel and an illumination device such as a backlight.

The image generating panel 212 includes an image generating region 212f having a rectangular shape having long sides and short sides. The image generating region 212f is a region of a surface of the image generating panel 212, which faces the color synthesizing element 213 and excludes a frame region that is a peripheral edge portion. The image generating region 212f is a region in which an image is substantially generated. The image generating panel 212 is disposed to face the color synthesizing element 213 and is bonded so that a longitudinal direction FR of the image generating region 212f is parallel to the line of intersection CR of the color synthesizing element 213.

The image generating panel 212 may include an external terminal region for electrically coupling the image generating panel 212 to the driving circuit board 31. The external terminal region may be provided outside the long side of the image generating region 212f. In this case, the external terminal region does not need to be disposed to face the color synthesizing element 213, because the external terminal region does not contribute to the generation of the image. Accordingly, the image generating panel 212 may be bonded such that the image generating region 212f faces the color synthesizing element 213 and the external terminal region protrudes outside the color synthesizing element 213.

The direction in which the external terminal region of the image generating panel 212 protrudes outside the color synthesizing element 213 is not particularly limited as long as adjacent image generating panels 212 do not interfere with each other. For example, the first image generating panel 212R may protrude leftward with respect to the color synthesizing element 213 in FIG. 3, the second image generating panel 212G may protrude upward with respect to the color synthesizing element 213 in FIG. 3, and the third image generating panel 212B may protrude rightward with respect to the color synthesizing element 213 in FIG. 3. Alternatively, the first image generating panel 212R and the third image generating panel 212B may both protrude rightward with respect to the color synthesizing element 213 in FIG. 3, and the second image generating panel 212G may protrude downward with respect to the color synthesizing element 213 in FIG. 3.

In the present embodiment, since the image generating panel 212 is bonded such that the longitudinal direction FR of the image generating region 212f is parallel to the line of intersection CR of the color synthesizing element 213, as described above, the dimension A of a side of the fifth surface 213e and the sixth surface 213f of the color synthesizing element 213 can be reduced, compared to when the image generating panel 212 is bonded such that the longitudinal direction FR of the image generating region 212f is perpendicular to the line of intersection CR of the color synthesizing element 213.

As illustrated in FIG. 2, the image generating modules 21 are oriented so that the line of intersection CR of the color synthesizing element 213 intersects the second optical axis AX2 when viewed from the direction of the first optical axis AX1. In other words, the image generating module 21 is oriented such that the fifth surface 213e or the sixth surface 213f of the color combining element 213 is visible in side view of the display apparatus 100, in other words, when viewed from an ear side of an observer wearing the display apparatus 100. Hereinafter, for ease of explanation, the above-described arrangement of the color synthesizing element 213 is referred to as a horizontal arrangement, and an arrangement in which the fifth surface 213e and the sixth surface 213f of the color synthesizing element 213 face upward and downward is referred to as a vertical arrangement.

Figure 4:
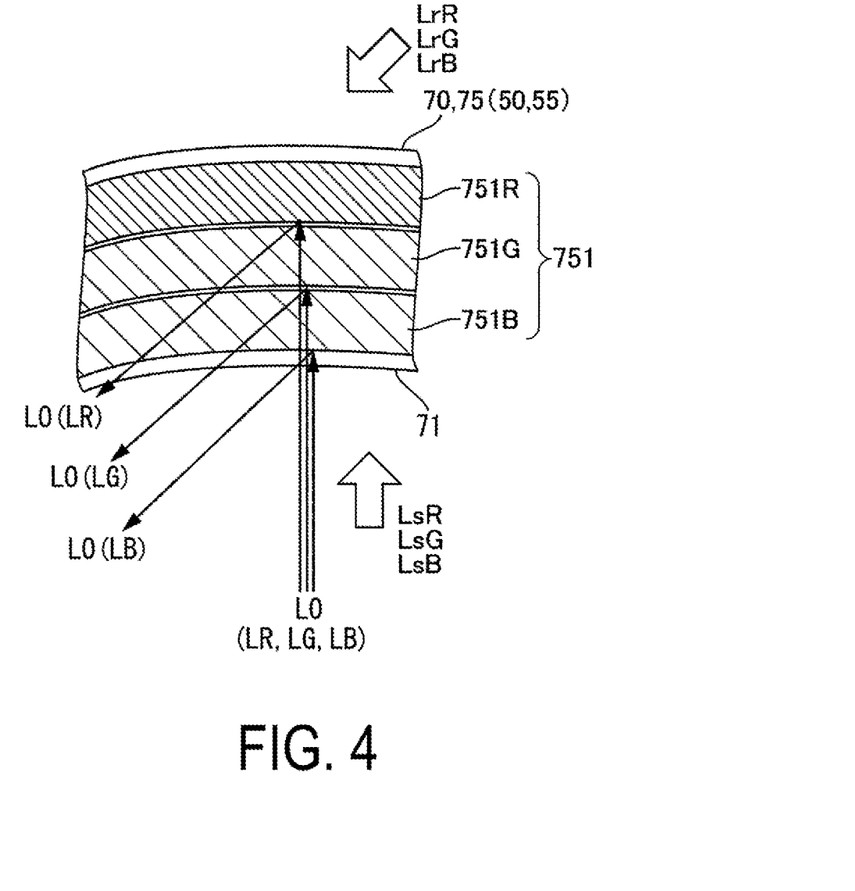
FIG. 4 is a cross-sectional view of a first diffraction element and a second diffraction element.

FIG. 4 is a schematic diagram of interference fringes 751 in the second diffraction element 70.

As illustrated in FIG. 4, the second diffraction element 70 includes a reflection-type volume hologram 75 that is a partial reflection-type diffraction optical element. Thus, the second diffraction element 70 forms a partial transmissive reflective combiner. Therefore, external light enters the eye E of the observer via the second diffraction element 70, and thus the observer can visually recognize an image in which the imaging light L0 generated by the image generating module 21 and the external light (background) are superimposed on each other.

The second diffraction element 70 diffracts the imaging light L0 diffracted by the first diffraction element 50 to form an exit pupil. The second diffraction element 70 faces the eye E of the observer. An incident surface 71 of the second diffraction element 70 on which the imaging light L0 is incident has a concave surface being recessed in a direction away from the eye E. In other words, the incident surface 71 has a shape having a central portion recessed and curved with respect to a peripheral portion in the incident direction of the imaging light L0. Thus, the imaging light L0 can be efficiently condensed toward the eye E of the observer.

The second diffraction element 70 includes the interference fringes 751 having a pitch corresponding to a specific wavelength. The interference fringes 751 are recorded as a difference in refractive index in a hologram photosensitive layer. The interference fringes 751 are inclined in one direction with respect to the incident surface 71 of the second diffraction element 70 so as to correspond to a specific incident angle. Therefore, the second diffraction element 70 diffracts and then deflects the imaging light L0 in a predetermined direction. The specific wavelength and the specific incident angle respectively correspond to a wavelength and an incident angle of the imaging light L0. This type of the interference fringes 751 can be formed by performing interference exposure on the holographic photosensitive layer by using reference light Lr and object light Ls.

In the present embodiment, the imaging light L0 is light for color display. Thus, in the second diffraction element 70, the interference fringes 751R, 751G, and 751B each having a pitch corresponding to a specific wavelength are formed. For example, the interference fringes 751R are formed at a pitch corresponding to a wavelength of 615 nm, for example, in a wavelength range from 580 nm to 700 nm, that is a red light region. The interference fringes 751G are formed at a pitch corresponding to a wavelength of 535 nm, for example, in a wavelength range from 500 nm to 580 nm, that is a green light region. The interference fringes 751B are formed at a pitch corresponding to a wavelength of 460 nm, for example, in a wavelength range from 400 nm to 500 nm, that is a blue light region.

The above-described configuration can be formed by forming a holographic photosensitive layer having sensitivity corresponding to the respective wavelengths, and performing interference exposure on the holographic photosensitive layer by using reference light LrR, LrG, and LrB and object light LsR, LsG, and LsB having the respective wavelengths.

Note that, the interference fringes 751R, 751G, and 751B may be formed in one layer in a superimposed manner by dispersing a photosensitive material having sensitivity corresponding to the respective wavelengths in the holographic photosensitive layer and then performing interference exposure on the holographic photosensitive layer by using the reference light LrR, LrG, and LrB and the object light LsR, LsG, and LsB having the respective wavelengths. Further, light having a spherical wave may be used as the reference light LrR, LrG, and LrB and the object light LsR, LsG, and LsB.

Since the first diffraction element 50 and the second diffraction element 70 have the same basic configuration, the first diffraction element 50 is not described in detail. However, the first diffraction element 50 includes a reflection-type volume hologram 75.

As illustrated in FIG. 2, the first diffraction element 50 includes a first surface 50a facing the second deflecting element 60, and a second surface 50b, which is a surface opposite to the first surface 50a. The first surface 50a is an incident surface on which the imaging light L0 is incident and has a concave surface being recessed. In other words, the first surface 50a has a shape having a central portion recessed and curved with respect to a peripheral portion in the incident direction of the imaging light L0. Thus, the first diffraction element 50 can efficiently deflect the imaging light L0 toward the second deflecting element 60.

Even when light rays are incident on the same interference fringe recorded in a volume hologram, the longer the wavelength of the light ray, the larger the amount of diffraction, and the shorter the wavelength of the light ray, the smaller the amount of diffraction. Therefore, when two diffraction elements (the first diffraction element 50 and the second diffraction element 70) are used, incident angle of light having wavelengths longer than a specific wavelength and incident angle of light having wavelengths shorter than the specific wavelength must be considered, otherwise aberration cannot be properly compensated. In addition, the configuration of the interference fringes must be considered, because the angle of diffraction varies depending on the number of interference fringes. In the optical system 10 illustrated in FIG. 2, the parameters such as the incident direction of the imaging light L0 with respect to the second diffraction element 70 are optimized, and thus aberration can be compensated.

The second deflecting element 60 includes a reflective surface having a central portion recessed with respect to a peripheral portion. The reflection surface includes a spherical surface, an aspheric surface, or a free-form surface. The second deflecting element 60 is configured to reflect the imaging light L0 emitted from the first diffraction element 50 to emit the reflected light toward the second diffraction element 70. The second deflecting element 60 includes a half mirror configured to reflect, toward the second diffraction element 70, the imaging light L0 diffracted by the first diffraction element 50 and transmit external light. As a result, in the display apparatus 100, a range in which the external scene can be visually recognized can be enlarged.

As illustrated in FIG. 2, the image generating module 21, the light-guiding optical system 25, the projection optical system 27, and the first mirror 231 of the first deflecting element 23 are arranged at a first height in the first direction Y (up-down direction). Further, the second mirror 232 of the first deflecting element 23, the first diffraction element 50, the second deflecting element 60, and the second diffraction element 70 are arranged at a second height in the first direction Y (up-down direction). The second height is higher than the first height.

In other words, when viewed along the direction of travel of the imaging light L0 emitted from the image generating module 21, the imaging light L0 travels at a substantially constant height until reaching the first mirror 231 via the light-guiding optical system 25 and the projection optical system 27. After the optical path is bent upward by the first mirror 231, the imaging light L0 travels at a substantially constant height higher than the height of the light path of the imaging light L0 before being incident on the first mirror 231 and reaches the second diffraction element 70 via the first diffraction element 50 and the second deflecting element 60.

Additionally, the image generating module 21 is disposed so as to protrude farther rearward than the first diffraction element 50. In other words, when a distance along the first optical axis AX1 between the image generating module 21 and the first mirror 231 is defined as T1, and a distance along the third optical axis AX3 between the first diffraction element 50 and the second mirror 232 is defined as T2, the distance T1 is greater than the distance T2. In addition, in the present embodiment, the light-guiding optical system 25 is also disposed so as to protrude farther rearward than the first diffraction element 50.

The above-described arrangement of the various optical elements included in the optical system 10 provides a space SP1 positioned rearward of the first diffraction element 50 and above the image generating module 21 and the light-guiding optical system 25. The driving circuit board 31 is disposed in the space SP1. In other words, the driving circuit board 31 is positioned to face the second surface 50b of the first diffraction element 50.

Each of the image generating panels 212R, 212G, and 212B of the image generating module 21 is electrically coupled to the driving circuit board 31 by a flexible circuit board (not illustrated). The position of the flexible circuit board is not particularly limited and the flexible circuit board may be positioned at any position.

Note that a base substrate (not illustrated) may be provided in a space positioned between the first optical axis AX1 and the third optical axis AX3, because the optical path of the imaging light L0 is bent in the up-down direction. By this configuration, optical elements, such as the image generating module 21, the light-guiding optical system 25, the projection optical system 27, and the first deflecting element 23, can be fixed to the base substrate.

In the display apparatus 100 according to the present embodiment, as illustrated in FIG. 2, the optical path of the imaging light L0 from the image generating module 21 to the second diffraction element 70 is bent in the up-down direction, and various optical elements are arranged in each of the two planes at different heights. Furthermore, since the driving circuit board 31 is disposed in the space SP1 provided by this arrangement, there is no need to separately provide a space for disposing the driving circuit board 31.

When above-described optical system is employed, the area when viewed from the first direction Y (the up-down direction) can be made smaller than that in known display apparatuses, and thus miniaturization of the display apparatus 100 can be achieved. In particular, the length in the second direction Z (front-rear direction) of the frame 91 accommodating the optical system 10 can be shortened, so that the frame 91 does not extend longer toward the ear of the observer, resulting in improving comfort to the observer during use.

In the image generating module 21, as described above, the dimension A of a side of the fifth surface 213e and the sixth surface 213f of the color synthesizing element 213 can be reduced as compared to that in known color synthesizing elements, and the color synthesizing element 213 is in the horizontal arrangement in which one side of the fifth surface 213e and the sixth surface 213f is oriented in the up-down direction. As a result, even when the various optical elements are arranged in each of the different two planes and the optical path of the imaging light L0 is bent in the up-down direction, it is possible to suppress increase in the dimension of the display apparatus 100 in the height direction.

In addition, the imaging light L0 is guided in air between the first diffraction element 50 and the second diffraction element 70, and a member such as a light-guiding plate is not used. Therefore, the center of gravity of the display apparatus 100 is positioned on the rear side, that is, on the ear side of the observer, and thus the pressure applied to the nose can be reduced. As a result, the display apparatus 100 is less likely to slip off, and the user comfort of the display apparatus 100 can be increased.

Second Embodiment

A second embodiment according to the present disclosure will be described below with reference to FIG. 5.

The basic configuration of a display apparatus according to the second embodiment is the same as that of the first embodiment except in arrangement of some optical components. Therefore, the overall configuration of the display apparatus will not be described.

Figure 5:
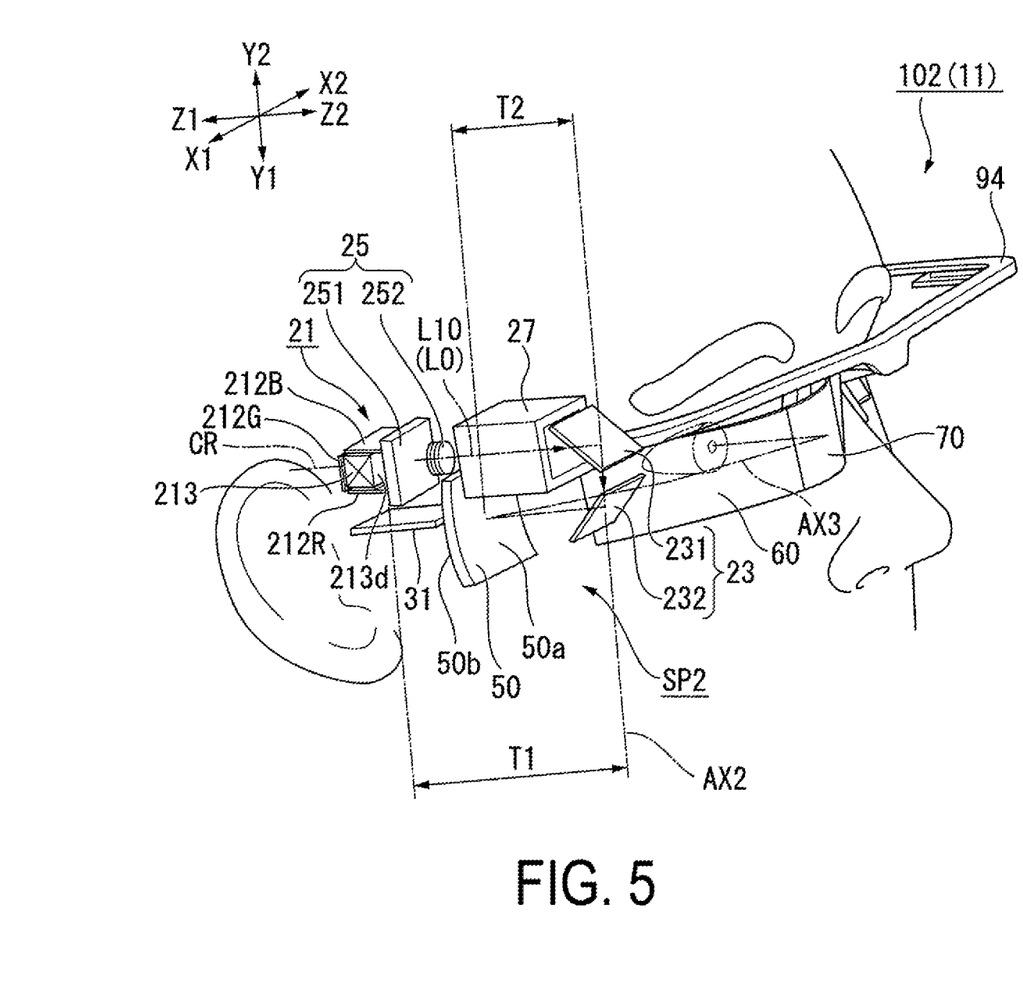
FIG. 5 is a perspective view of an optical system of a head-mounted display apparatus according to a second embodiment.

FIG. 5 is a perspective view of an optical system of the display apparatus according to the second embodiment.

In FIG. 5, the components common to those of the drawings relating to the first embodiment are denoted with the same reference numerals, and detail description thereof is not repeated.

As the optical system 11, a display apparatus 102 according to the second embodiment includes the image generating module 21, the light-guiding optical system 25, the projection optical system 27, the first deflecting element 23, the first diffraction element 50, the second deflecting element 60, the second diffraction element 70, and the driving circuit board 31, as illustrated in FIG. 5.

Similarly to the first embodiment, the first deflecting element 23 includes the first mirror 231 and the second mirror 232. However, the orientation of the first deflecting element 23 is vertically inverted as compared to the orientation of the first deflecting element 23 in the first embodiment, and thus the first mirror 231 is positioned on the upper side, and the second mirror 232 is positioned on the lower side. As a result, the first mirror 231 is configured to deflect the imaging light L0, which has been emitted from the image generating module 21, in a one direction Y1 (downward) of the first direction Y. The second mirror 232 is configured to deflect the imaging light L0, which has been deflected by the first mirror 231 so as to travel downward, in first direction Z1 (rearward) of the second direction Z.

The image generating module 21, the light-guiding optical system 25, the projection optical system 27, and the first mirror 231 of the first deflecting element 23 are arranged at a first height in the first direction Y (up-down direction). Further, the second mirror 232 of the first deflecting element 23, the first diffraction element 50, the second deflecting element 60, and the second diffraction element 70 are arranged at a second height in the first direction Y (up-down direction). In contrast to the first embodiment, the second height is lower than the first height in the present embodiment.

In other words, when viewed along the direction of travel of the imaging light L0 emitted from the image generating module 21, the imaging light L0 travels at a substantially constant height via the light-guiding optical system 25 and the projection optical system 27 until reaching the first mirror 231. After the optical path is bent downward by the first mirror 231, the imaging light L0 travels at a substantially constant height lower than the height of the light path of the imaging light L0 before being incident on the first mirror 231 and reaches the second diffraction element 70 via the first diffraction element 50 and the second deflecting element 60.

In the present embodiment, a space SP2 is provided rearward of the first diffraction element 50 and below the image generating module 21 and the light-guiding optical system 25. The driving circuit board 31 is disposed in the space SP2.

Other configurations of the display apparatus 102 are the same as those of the first embodiment.

The present embodiment can also achieve the same effects as the first embodiment, i.e., miniaturization of the display apparatus 102 resulted from the reduced area when viewed from the first direction Y (the up-down direction) which is smaller than that in known display apparatuses, suppression of increase in the dimension of the display apparatus 102 in the height direction, and reduction of pressure applied to a nose.

Third Embodiment

A third embodiment according to the present disclosure will be described below with reference to FIG. 6.

The basic configuration of a display apparatus according to the third embodiment is the same as that of the first embodiment except in arrangement of some optical components. Therefore, the overall configuration of the display apparatus will not be described.

Figure 6:
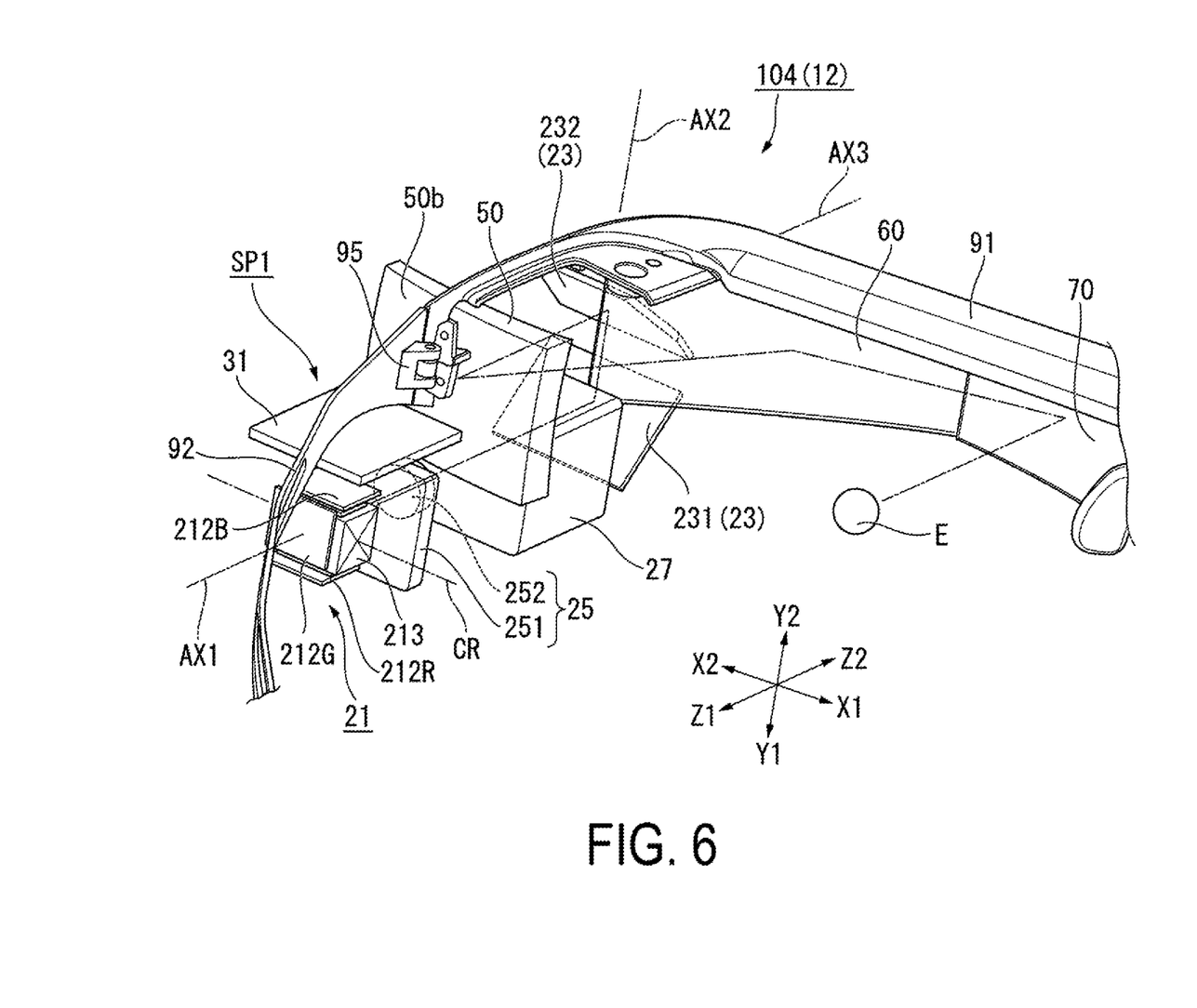
FIG. 6 is a perspective view of an optical system of a head-mounted display apparatus according to a third embodiment.

FIG. 6 is a perspective view of an optical system of the display apparatus according to the third embodiment.

In FIG. 6, the components common to those of the drawings relating to the first embodiment are denoted with the same reference numerals, and detail description thereof is not repeated.

As the optical system 12, a display apparatus 104 according to the third embodiment includes the image generating module 21, the light-guiding optical system 25, the projection optical system 27, the first deflecting element 23, the first diffraction element 50, the second deflecting element 60, the second diffraction element 70, and the driving circuit board 31, as illustrated in FIG. 6. The display apparatus 104 further includes, as a housing, the frame 91, temples 92, and the hinges 95 (coupling portion).

The frame 91 accommodates the image generating module 21, the first deflecting element 23, the first diffraction element 50, the second deflecting element 60, and the second diffraction element 70. Note that, in FIG. 6, the part of the frame 91 that accommodates the optical elements is not illustrated. The temple 92 is coupled to an end of the frame 91 and a member configured to be hooked on an ear of an observer. By the hinge 95, the temple 92 is foldably coupled with the frame 91.

In the present embodiment, similarly to the first embodiment, the space SP1 is provided rearward of the first diffraction element 50 and above the image generating module 21 and the light-guiding optical system 25. In the space SP1, the driving circuit board 31 is positioned to face the second surface 50b of the first diffraction element 50. Furthermore, in the space SP1, the hinge 95 is positioned above the driving circuit board 31 to face the second surface 50b of the first diffraction element 50.

Other configurations of the display apparatus 104 are the same as those of the first embodiment.

The present embodiment can also achieve the same effects as the first embodiment, i.e., miniaturization of the display apparatus 104 resulted from the reduced area when viewed from the first direction Y (the up-down direction) which is smaller than that in known display apparatuses, suppression of increase in the dimension of the display apparatus 104 in the height direction, and reduction of pressure applied to a nose.

In particular, in the present embodiment, the hinge 95 is disposed at a position lower than the upper edge of the first diffraction element 50 to suppress an increase in the dimension of the display apparatus 104 in the height direction. In addition, when the display apparatus 104 is viewed in the up-down direction, the position of the hinge 95 overlaps with the positions of the light-guiding optical system 25 and the driving circuit board 31, and thus, it is possible to increase the length of the temple 92 as compared to when the hinge 95 is disposed at a position further rearward than the image generating module 21, for example. As a result, the elasticity of the temple 92 can be increased, and the holding force applied to a head of an observer by the display apparatus 104 can be increased. Also, in relation to the observer, the hinge 95 is positioned at a relatively forward position, and thus the observer can use the display apparatus 104 similarly to the eyeglass.

Note that the technical scope of the present disclosure is not limited to the above-described embodiments, and various modifications can be made to the above-described embodiments without departing from the spirit and gist of the present disclosure.

For example, although the above-described embodiment describes an example in which the first deflecting element includes a total reflection mirror, the first deflecting element may include a total reflection prism, for example. Further, the display apparatus may not necessarily include the second deflecting element.

Additionally, although the above-described embodiment describes an example in which the first diffraction element and the second diffraction element include a reflection-type volume hologram, the first diffraction element and the second diffraction element may include another hologram element such as a surface relief hologram, a blazed hologram, for example. Even when these holographic elements are used, it is possible to obtain a thin diffraction element having high diffraction efficiency.

In addition, it is possible to change, as appropriate, the number, arrangement, shape, or other specific configurations of each constituent element of the head-mounted display apparatuses illustrated as examples in the embodiments described above.

What is claimed is:

1. A head-mounted display apparatus, comprising:
an image generating module configured to emit imaging light along a first optical axis;
a first deflecting element including a first deflecting portion and a second deflecting portion, the first deflecting portion configured to deflect, along a second optical axis intersecting the first optical axis, the imaging light emitted from the image generating module, the second deflecting portion configured to deflect, along a third optical axis intersecting the second optical axis, the imaging light deflected by the first deflecting portion;
a first diffraction element configured to diffract the imaging light deflected by the second deflecting portion; and
a second diffraction element configured to diffract the imaging light diffracted by the first diffraction element to form an exit pupil, wherein
the image generating module includes a plurality of image generating panels for emitting different colors of emission light and a color synthesizing element configured to synthesize the emission light emitted from the plurality of image generating panels,
the color synthesizing element includes a first synthesis film and a second synthesis film, the first synthesis film and the second synthesis film intersecting each other,
each of the plurality of image generating panels is disposed to face the color synthesizing element, and a longitudinal direction of an image generating region of the image generating panel is parallel to a line of intersection of the first synthesis film and the second synthesis film, and
a distance along the first optical axis between the image generating module and the first deflecting portion is longer than a distance along the third optical axis between the first diffraction element and the second deflecting portion.

2. The head-mounted display apparatus according to claim 1, wherein
the color synthesizing element is oriented so that the line of intersection intersects the second optical axis when viewed from a direction of the first optical axis.

3. The head-mounted display apparatus according to claim 1, further comprising a driving circuit board configured to drive the plurality of image generating panels, wherein
the first diffraction element includes a first surface facing the second deflecting portion and a second surface opposite to the first surface, and
the driving circuit board is positioned to face the second surface of the first diffraction element.

4. The head-mounted display apparatus according to claim 3, further comprising:
a frame configured to accommodate the image generating module, the first deflecting element, the first diffraction element, and the second diffraction element;
a temple coupled to the frame; and
a coupling portion configured to foldably couple the temple to the frame, wherein
the coupling portion is positioned to face the second surface of the first diffraction element.

5. The head-mounted display apparatus according to claim 1, further comprising a second deflecting element configured to reflect, toward the second diffraction element, the imaging light diffracted by the first diffraction element and transmit external light.

6. The head-mounted display apparatus according to claim 1, wherein
the first diffraction element and the second diffraction element include a reflection-type volume hologram.

* * * * *